US005173790A

United States Patent [19]

Montgomery

[11] Patent Number: 5,173,790

[45] Date of Patent: Dec. 22, 1992

[54] ADAPTIVE FILTER WITH CORRELATION WEIGHTING STRUCTURE

[75] Inventor: Robert M. Montgomery, Indiatlantic, Fla.

[73] Assignee: Harris Corporation, Melbourne, Fla.

[21] Appl. No.: 754,267

[22] Filed: Aug. 29, 1991

Related U.S. Application Data

[63] Continuation of Ser. No. 545,622, Jun. 29, 1990, abandoned.

[51] Int. Cl.[5] .......................... G02F 1/11; G03H 1/02; G06E 3/00

[52] U.S. Cl. .......................................... 359/7; 359/306; 359/310; 359/561; 364/822; 364/824

[58] Field of Search .......................... 350/3.64, 162.13; 364/822, 824; 359/7, 559, 561, 560, 285, 287, 305, 306, 307, 308, 310

[56] References Cited

U.S. PATENT DOCUMENTS

| | | | |
|---|---|---|---|
| 4,696,533 | 9/1987 | Kingston et al. | 350/96.14 |
| 4,726,639 | 2/1988 | Brody | 350/3.64 |
| 4,865,427 | 9/1989 | Kingston et al. | 350/96.14 |
| 4,877,297 | 10/1989 | Yeh | 350/3.67 |

OTHER PUBLICATIONS

Hong et al., "Photorefractive Crystals as Adaptive Elements in Acoustooptic Filters", SPIE vol. 789, Optical Technology for Microwave Applications (1987), pp. 136 to 144.

*Primary Examiner*—Martin Lerner

*Attorney, Agent, or Firm*—Evenson, Wands, Edwards, Lenahan & McKeown

[57] ABSTRACT

An adaptive filter having a correlation weighting structue having a single Bragg cell, acting as a tapped delay line and having an input and an output, the Bragg cell intensity modulating a write laser beam for computing correlation values, and modulating a read laser field strength for multiplying the correlation values by delayed signal values. A photorefractive element is arranged such that substantial portions of diffracted and undiffracted light components from the single Bragg cell overlap within the photorefractive element. A write laser is intensity modulated by an error signal to produce an optical write signal that is received at the photorefractive element input and which writes correlation coefficients in the photorefractive element. A read laser produces a light signal, a portion of which is diffracted by the single Bragg cell, the portion of the light signal that is not diffracted by the single Bragg cell being partially diffracted by the photorefractive element. A photodetector having an input receives the portion of the light signal that is diffracted by the single Bragg cell and the portion of the read laser light signal that is diffracted by the photorefractive crystal, the photodetector output producing a filtered signal. The read laser light is isolated from the write laser light such that only the read laser light reaches the photodetector.

4 Claims, 3 Drawing Sheets

ADAPTIVE FILTER WITH CORRELATION WEIGHTING STRUCTURE

This is a continuation of application Ser. No. 07/545,622, filed Jun. 29, 1990, now abandoned.

FIELD OF THE INVENTION

The present invention relates to adaptive interference canceling filters and adaptive antenna array processors, and more specifically, to a correlating weighting structure having acousto-optic Bragg cells and photorefractive elements to be used in an adaptive filter or antenna array processor.

BACKGROUND OF THE INVENTION

In modern military communications, radar, and electronic warfare, so-called "exotic" signals are now common, as are very dense signal environments. Real time processes for signal detection and analysis, interference cancellation and timing acquisition are therefore becoming increasingly important and computationally intensive. Optical signal processing, due to its parallel structure and the natural implementation of fundamental signal processing algorithms such as the Fourier transform, offers one of the more promising and successful techniques for wide-band signal processing. The disadvantage of optical signal processing lies in the electronic to optical conversion and optical to electronic interfaces, which create significant bottlenecks in the process.

Acousto-optic Bragg cells represent the most successful technology to date for the electronic/optical interface in signal processing. These Bragg cells have evolved to become the premier device for data input to broad band with optical signal processing systems. Bandwidths ranging from 20 MHz to in excess of 1 GHz are presently available with time bandwidth products in the range of 1,000. Recent activity in optical signal processing has focused on using photorefractive materials as a potential photodetector/processor element.

Photorefractive materials have temporal and spatial response characteristics which make them well-suited to adaptive filter architectures based on time integrating correlator configurations with acoustic Bragg cell input devices. A significant advantage of the photorefractive integrator approach is that it is readily extended to two-dimensional processing by using arrays of acoustic channels. This makes the approach potentially very effective for adaptive antenna array processing.

An adaptive filter architecture using a photorefractive element and a time-integrating structure to compute correlation coefficients has been described by J. Hong, S. Hudson, J. Yu, D. Psaltis, in "Photorefractive Crystals as Adaptive Elements in Acousto-optic Filters", *SPIE Vol.* 789 *Optical Technology from Microwave Applications III,* Orlando, 1987. The optically-computed correlation coefficients are simultaneously used to optically form a signal estimate and adaptive correlator. This processor represents a two-stage optical computing process in which it is not necessary to convert to electrical signals between a computation of the correlation coefficients and their subsequent use.

The above-described system is relatively large due to the fact that separate Bragg cell arrays are used for computing correlations, and for performing the final signal weighting and summation. There are thus two separate paths, one for the "write" beam and one for the "read" beam. In applications where space is a critical factor, such as in aircraft, the use of separate beam paths for the read and write beams and separate Bragg cells for the two functions of computing correlations and final weighting makes the apparatus less desirable.

There is a need for a photorefractive adaptive filter that is both rugged and compact, yet provides a fast response with low power usage. Such an adaptive filter can be used in a phased array antenna, for example.

Phased array antennas have many benefits when compared to fixed beam antennas including the ability to form multiple beams, the ability to scan rapidly without mechanical motion, and the ability to perform pattern nulls on interfering emitters. The implementation of real arrays which realize these advantages is limited by the complexity of the phase shift network required by unpredictable phase errors in the components involved. Adaptive techniques have the potential for alleviating many of these problems.

Successful systems to date have relied on discrete RF implementation of the adaptive algorithms with small arrays (small because of the complexity and expense of the necessary hardware) using analog or digital implementation of the required amplitudes and phases. Optical techniques have been used to perform the calculations, but the systems employed to date have been large, complex, and limited in performance because of their complexity.

There is a need for a correlating weighting structure that can be used in an adaptive antenna array processor that is compact, rugged and operates with a fast response using low power.

SUMMARY OF THE INVENTION

These and other needs are met by the present invention which provides an adaptive filter with a correlation weighting structure having a single Bragg cell and a photorefractive element. The single Bragg cell serves as the delay element for two separate functions. It computes correlation coefficients and multiplies the delayed input signal with the correlation coefficients. The photorefractive element has an output and an input that is coupled to the output of the single Bragg cell. The photorefractive element is placed in a near image plane of the single Bragg cell. (A "near image" plane is defined as a plane where there is substantial overlap between the diffracted and the undiffracted light components which exit the Bragg cell.) The photorefractive element forms correlation coefficients as a refractive index grating. The correlation weighting structure also includes a write laser modulated by an error signal to produce an optical write signal that is received at the photorefractive element input and which writes correlation coefficients in the photorefractive element. A read laser produces a light signal, a portion of which is diffracted by the single Bragg cell. The portion of the light signal that is not diffracted by the single Bragg cell is partially diffracted by the photorefractive element. A photodetector having an input and an output is used, the photodetector input receiving the portion of the read laser light signal that is diffracted by the single Bragg cell and a portion of the read laser light signal that is diffracted by the photorefractive element. The photodetector output provides a filtered signal.

The use of the same Bragg cell for computing correlations and for performing the final signal weighting and summation allows the Bragg cell and the photorefractive element to be placed in close proximity. In an embodiment of the invention, the Bragg cell and the photorefractive element can be monolithically integrated in the same material. Thus, a very compact, rugged adaptive filter is made possible by the present invention.

An application of the present invention is an adaptive antenna array processing system in which the Bragg cell is a multichannel Bragg cell. By extending the Bragg cell to be a multichannel Bragg cell, and because the same Bragg cell is used for computing correlation coefficients and performing the final signal weighting and summation, the adaptive antenna array processor is rugged, compact and provides a fast response, with the advantage of simplicity in structure.

Other applications of the present invention will be evident to those skilled in the art of adaptive filters. These include adaptive equalizers, adaptive antenna beam formers, adaptive antenna null steering systems, adaptive interference cancelling filters, and adaptive timing acquisition for spread spectrum systems.

DETAILED DESCRIPTION OF THE DRAWINGS

Figure 1:
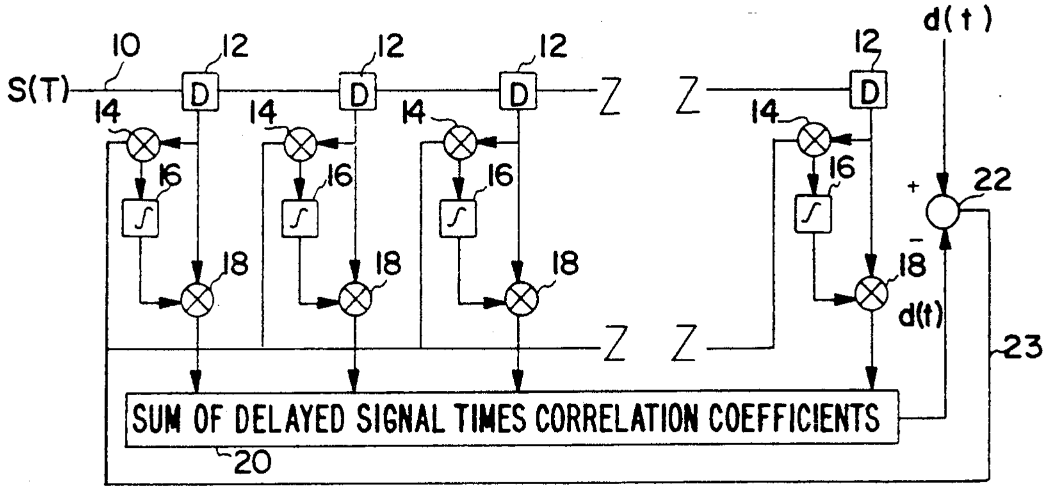
FIG.1 PRIOR ART
FIG. 1 shows an analog implementation of the LMS algorithm.

The most widely used algorithm for adaptive filtering is a Least Means Squared error or "LMS" algorithm. A block diagram of an analog implementation of the LMS algorithm is shown in FIG. 1. This analog implementation is well known.

The analog implementation of the LMS algorithm in FIG. 1 has a tapped delay line 10 on which a plurality of tap delays 12 are located. Each of these tap delays 12 produces a delayed signal. The delayed signal from a tap delay 12 is multiplied by a weight value (or correlation coefficient) at one of a plurality of multipliers 18. The product of the weight value and the delayed signal from each of the multipliers 18 is provided to a summer 20, which sums the delayed signal times the correlation coefficients. This sum is provided as a negative signal to an adder 22, which receives as its other input the delayed signal.

The output of the adder 22 is an error signal, which is the difference between the sum from summer 20 and the delayed signal d(T). This error signal is provided as an input to each one of a plurality of multipliers 14. Each multiplier 14 also receives a delayed signal value from an associated tap delay 12 and multiplies it by the error signal. The output value, a product of the error signal and the delayed signal value, forms the input to an integrator 16. The output of the integrator 16 is the correlation coefficient for that delay value. Thus, there will be different correlation coefficients for the different delay values, and these correlation coefficients are adjustable so that the filtering is adaptive.

Figure 2:
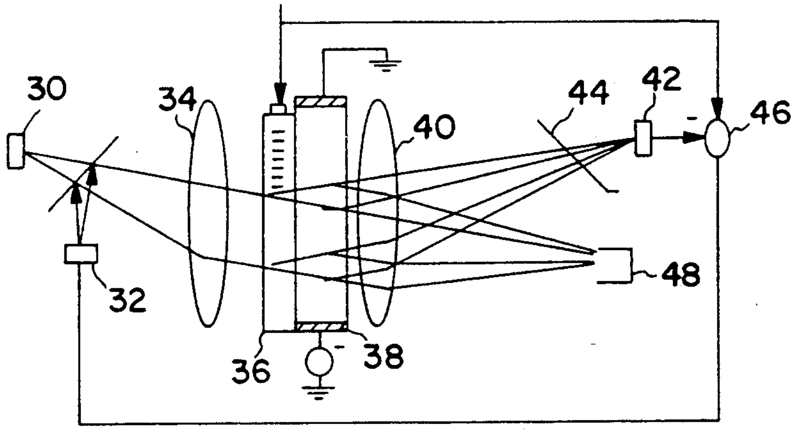
FIG. 2 shows schematically an adaptive filter using the correlating weighting structure of the present invention.

The LMS algorithm of FIG. 1 is implemented optically by the correlating weighting structure of the present invention, an embodiment of which is illustrated in FIG. 2 in use as an adaptive filter. This adaptive filter has a read laser 30 and a writer laser 32 which are focused onto an acousto-optic Bragg cell 36 by a first lens 34. Some of the light from these two lasers 30, 32 is refracted by the Bragg cell 36, as described in more detail later, and some of the light is refracted by a photorefractive element 38. A second lens 40 focuses the refracted laser light onto a photodetector 42. The photodetector 42 provides an electric signal to an adder 46, which also receives the original signal. The electric signal from the photodetector 42 is subtracted from the original signal by adder 46 to produce an error signal that modulates the write laser 32.

The filter 44 prevents light emitted by the write laser 32 from reaching the detector 42. Only the light from the read laser 30 reaches the detector 42. The unused light energy is collected by a collector 48.

The Bragg cell 36 acts as a grating, which moves at the speed of sound propagation through the cell material. The refractive characteristics of the Bragg cell are controlled by the acoustic signal applied to the Bragg cell. The Bragg cell 36 is an intensity modulator. That is, the interference of the undiffracted and diffracted light components produces an intensity pattern at the output surface of the Bragg cell. This sinusoidal intensity pattern travels at the acoustic velocity. Modulation of the source at the same frequency as the Bragg cell drive causes the fringe pattern to appear stationary on the photorefractive material 38.

Similarly, the photorefractive element 38 acts as a grating. However, the refractive characteristics of the photorefractive element 38 are changed by the write laser 32. The correlation coefficients reside in the photorefractive element 38 as a sinusoidal refractive index grating. The following is a more detailed description of the Bragg cell 36 and the photorefractive element 38.

The present invention uses a single Bragg cell 36 as an intensity modulator in a time integrating architecture to perform the functions of delay and correlation. The same Bragg cell 36 is reused to multiply the delayed signal times the correlation coefficients. As stated earlier, these correlation coefficients reside in the photorefractive element 38 as a sinusoidal refractive index grating. Because the same Bragg cell 36 is used for both writing the correlation coefficients and for probing them, the phase of the output signal is a function only of the phase of the photorefractive grating of the element 38 relative to the phase of the intensity pattern (fringe pattern) which produced the grating. This grating phase is a fundamentally important parameter in the theory of the photorefractive behavior of materials.

The acoustic Bragg cell 36 produces an optical intensity pattern at its output surface which is an image of the acoustic wave. For an input signal, cos $\omega_c(t-T_d)$, with an arbitrary time delay, $T_d$, this intensity is a travelling wave of the form $$I(x,t)=I_o(t)\{1+2\sqrt{\eta_1(1}-\eta_1)\sin\,\omega_c(t-_d-x/v)\} \qquad (1)$$

where $\eta_1$ is the diffraction efficiency of the Bragg cell and $I_o$ is the incident illumination. It should be recognized that there is a 90 degree phase shift between the acoustic wave field (strain) and the resultant optical intensity pattern. If a time integrating element is placed in an image plane of this intensity pattern and the source producing $I_o$ is modulated with a reference signal to produce illumination of the form, $$I_o = P_o(1 + m_s \cos \omega_c t) \quad (2)$$

then the low frequency component, $I_{lf}$, of the intensity is the short term average of the product expressed in Eq. (1).

$$I_{lf} = P_o\{1 - M_s\sqrt{\eta_1(1-\eta_1)}\sin \omega_c(T_d + x/v)\} \quad (3)$$

Eq. (2) essentially defines $m_s$ as the fractional modulation of the source intensity.

The response of the photorefractive material to the exposure function such as that given in Eq. (3) has been the subject of many publications over the past decade. The theoretical model for the present discussion is taken from a recent summary describing the behavior of photorefractive materials with stationary and moving fringe patterns in the presence of applied bias field.

For the following discussion, the parameter definitions below will be used:

| | |
|---|---|
| E | externally applied bias field |
| $n_o$ | density of free charge carriers |
| m | optical fringe contract |
| $m_s$ | source modulation ratio |
| D | diffusion constant |
| $\tau$ | free carrier lifetime decay constant |
| $N_A$ | density of acceptor sites |
| $E_D = K(k_bT/e)$ | diffusion field |
| $r_E = \mu\tau E$ | carrier drift length |
| $r_D = \sqrt{(D\tau)}$ | carrier diffusion length |
| $l_s = \sqrt{(\epsilon\,\epsilon_o kbT/e^2N_A)}$ | the Debye screening length |
| $l_E = \epsilon\epsilon_o k_b E/eN_A$ | electron tightening length |
| $\tau m = \epsilon\epsilon_o/e\mu n_o$ | the Maxwell dielectric relaxation time |

For a stationary fringe pattern and a constant applied field, E, the complex steady state space charge field is given in Eq. (4).

$$E_{sc} = -m(E + iE_D)/(1 + K^2 l_s^2 - Kl_E) \quad (4)$$

If one uses the exposure distribution given by Eq. (3) to compute m and uses cosKx for a phase reference, the following expression is obtained for the space charge field:

$$E_{sc} = im_s\sqrt{\eta_1(1-\eta_1)}\exp(i\omega_c T_d)(E + iE_D)/(1 + K^2 l_s^2 - iKl_E) \quad (5)$$

The refractive index variation is proportional to this electric space charge field and the grating diffraction efficiency, $\eta_2$, is proportional to the refractive index variation squared.

In the acoustic Bragg cell/photorefractive combination of the present invention there are two refractive index gratings. The photorefractive grating has a diffracted light field strength, $\sqrt{\eta_2}$, proportional to E as expressed by Eq. (5). The refractive index grating propagating in the Bragg cell has a diffracted light field strength, $\sqrt{\eta_1}$, proportional to the acoustic strain. The total grating is a combination of these two. A complete solution of the diffraction from these two thick phase gratings is quite complex and very dependent on the geometry. For purposes of this discussion, and for many other practical purposes, the grating strengths can be summed. The diffracted light intensity at any given x location is then proportional to the square of this sum of these two diffracted field components. The cross product term in this squared sum is separable because the motion of the acoustic wave causes a fluctuation at the carrier frequency $\omega_c$. A phase shift $\exp(i\omega_c T_d)$ appears in the stationary photorefractive grating and a cancelling $\exp(-i\omega_c T_d)$ appears in the travelling acoustic grating. Therefore the phase of the output intensity modulation is independent of the signal delay $T_d$. In the small diffraction efficiency approximation the total light power deflected from a region of width dx at location x is $$dP_d = I_o(\eta_1 + \eta_2 + 2\sqrt{(\eta_1\eta_2)})\sin(\omega_c t + \phi)dx \quad (6)$$

The time variation in this equation is written as a sine (90 degrees phase shift relative to the cosine source modulation) in recognition of the effect of the 90 degree phase shift between intensity and acoustic strain. This is also the source of the leading i multiplier in the right side of Eq. (5). This leaves the remaining phase, $\phi$, as the phase shift between the intensity pattern and the resultant photorefractive grating. In this way $\phi$ corresponds to the phase shift usually referred to in literature concerning the photorefractive effect. When a separate, unmodulated, read laser beam is used, the probe power deflected to the photodetector 42 is sinusoidally modulated at the carrier frequency with a phase which is always $90+\phi$ degrees relative to the write source modulation. This output intensity modulation is independent of the delay incurred by the signal before it entered the Bragg cell 36 and independent of the position in the Bragg cell 36. Therefore Eq. (6) provides a way to measure $\phi$ directly, that is, by measuring the phase between the laser source modulation and the photodetector output.

For diagnostic applications and some signal processing applications it may be advantageous to use the modulated write laser 32 as the read laser 30 instead of a separate laser. In that case, the $I_o$ in Eq. (6) is the laser power as expressed by Eq. (2) and the total power received by the photodetector 42 is:

Equation (7):

$$p_d = P_o(1 + m_s\cos\omega ct)\,[\eta_1(1-\eta_2) + \eta_2(1-\eta_1) + 2\sqrt{\{\eta_1(1-\eta_2)\eta_2(1-\eta_1\}}\sin(\omega_c t + \Phi))\}$$

The dc terms in Eq. (7) will multiply times the sine and cosine terms to yield photodetector output at the original carrier frequency. The cos $(\omega_c t)$ term multiplied times the $\sin(\omega_c t)$ term will produce a photodetector output at a frequency of $2\omega_c$.

The total fundamental signal component is found by vectorially adding the two fundamental components of Eq. (7). In the small diffraction efficiency limit all $(1-\eta)$ terms may approximated as 1 with little loss of accuracy. The simplified result is $$|P_d|_{fund} = P_o[m_s^2(\eta_1+\eta_2)^2 + 4\eta_1\eta_2 - 4m_s(\eta_1+\eta_2)\sqrt{(\eta_1\eta_2)}\sin(\phi)]^{\frac{1}{2}} \quad (8)$$

When the read laser is unmodulated, $(m_s=0)$ Eq. (8) gives the same result as Eq. (6).

In operation, the Bragg cell 36 operates as the tapped delay line 10 of FIG. 1. The use of a Bragg cell as a tapped delay line is known. Some of the light signal from the read laser 30 will be diffracted by the Bragg cell 36. Some of this signal will be further diffracted by the photorefractive element 38. However, some of the light will not be further diffracted by the photorefractive element 38 and is detected at the detector 42. This light signal (the signal diffracted only by the Bragg cell 36) is equivalent to the delayed signal value from the delay element 12 of FIG. 1.

The portion of the light from the read laser 30 that is not refracted by the Bragg cell 36 but is refracted by the photorefractive element 38 is equivalent to the signal from the tapped delay 12, the multiplier 14 and the integrator 16. This light signal that is diffracted only by the photorefractive element 38 (i.e. the correlation signal) is also detected by the detector 42. The signal that is detected by the detector 42 is proportional to the product of the correlation signal times the delayed signal. The output of the photodetector 42 is an oscillation which is at the frequency of a sound wave.

The above description shows an adaptive canceller for narrow-band interference that implements the LMS algorithm with the correlation weighting structure according to the present invention. Such a correlation weighting structure can be used in many other applications. One such application is in an antenna array processor constructed in accordance with an embodiment of the present invention and illustrated in FIG. 3.

Phased array antennas have many benefits when compared to fixed-beam antennas including the ability to form multiple beams, the ability to scan rapidly without mechanical motion and the ability to form power nulls on interfering emitters. The implementation of real arrays which realize these advantages is limited by the complexity of the phase shift network required and by unpredictable phase errors and the components involved.

Figure 3:
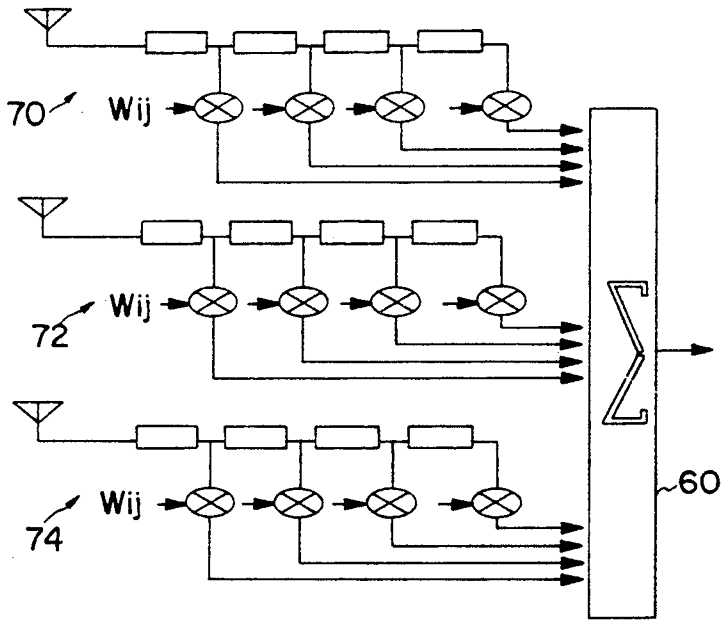
FIG. 3 schematically shows an adaptive antenna array.

The basic structure of an array antenna that uses adaptive filters 70, 72, 74 is shown in FIG. 3. The inputs used to compute the weights, $W_{ij}$, determines the specific kind of adaptation, for example, beam forming, null steering, etc. The adaptive antenna array constructed in accordance with an embodiment of the present invention uses photorefractive adaptive filters with correlating weighting structures such as that shown in FIG. 2 for each of the filters 70, 72, 74 coupled to the summer 60.

Figure 4:
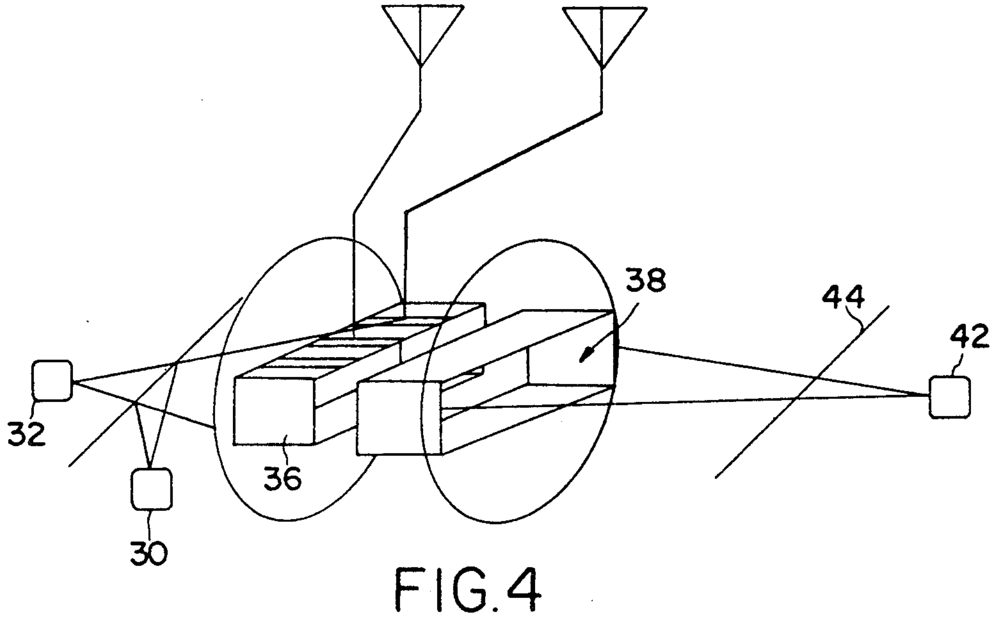
FIG. 4 shows the basic components of an adaptive antenna array processor using the correlating weighting structure of the present invention.

A practical physical embodiment of the antenna array of FIG. 3 is shown in FIG. 4. The photorefractive element forms a diffraction grating having a strength that is proportional to the correlation between the signals in the multichannel Bragg cell 36 and a modulated laser source (the write laser 32). A second laser, the read laser 30, forms the product of these correlation values with the incoming delayed signal and sums the result as a heterodyne beat on the single photodetector 42.

As an example, a carrier frequency of 300 MHz is assumed with a bandwidth of 30 MHz to accommodate a 20 megachip per second spread signal. The total delay time of 0.5 microseconds is also assumed. This effectively allows correlation to occur with the timing uncertainty of 10 chip times. Also, the equivalent of 10 antenna beams are being simultaneously searched. Therefore, the system will search at a rate one hundred times faster than a system with a totally sequential search.

The acoustic Bragg cell can be implemented as a longitudinal wave in gallium arsenide and the photorefractive material can also be made of gallium arsenide. This makes it possible to use a single monolithic crystal for both functions.

Separate gallium indium arsenide lasers are used as the read and write lasers 30, 32. The read laser 30 will be 20 milliwatts at 1.3 microns and the write laser 32 is 50 milliwatts at 1.2 microns wavelengths. These lasers 30, 32 are commercially available and the wavelength separation is sufficient for easy separation with simple filters. At the same time, the wavelength difference is small enough so that Bragg angle matching over the band is not a serious problem.

The acoustic velocity for the longitudinal wave is 5.4 millimeters per microsecond so the Bragg cell length, $L_d$, for 0.5 microsecond delay is 2.7 mm. The acoustic wavelength at 300 MHz is approximately 18 microns. To keep the acoustic propagation distance within the near field distance, the transducer height, D, must satisfy the equation $D>\sqrt{(F2L_d)}$. In this equation, F is a factor that adjusts for the anisotropic propagation in crystalline materials, with $F=0.6$ for the wave chosen. For designs using this and the other parameters given, the near field condition is satisfied with the $D>170$ microns. An element to element transducer spacing of 250 microns is assumed with a transducer height, D, of 200 microns which provides twenty percent (20%) guard space. The ten (10) element transducer array will then be 2.5 mm wide.

With spillover and reflection losses, a total optical efficiency of ten percent (10%) is assumed for both the read and write laser beams. This produces a total illumination power in the write beam of 5 milliwatts or 0.07 watt/cm$^2$. The read laser beam power of 2 milliwatts will have only a small effect on the write beam fringe contrast.

For the photorefractive effect in gallium arsenide, a typical relaxation time is 80 microseconds at a power density of 1 watt/cm$^2$. At the power density of 0.07 watt/cm$^2$ in the exemplary system, a response time (integration time in the correlator) of 3 milliseconds is predicted. Laboratory measurements with similar power densities and similar field strengths have given time constants between 0.2 and 2 milliseconds.

Figure 5:
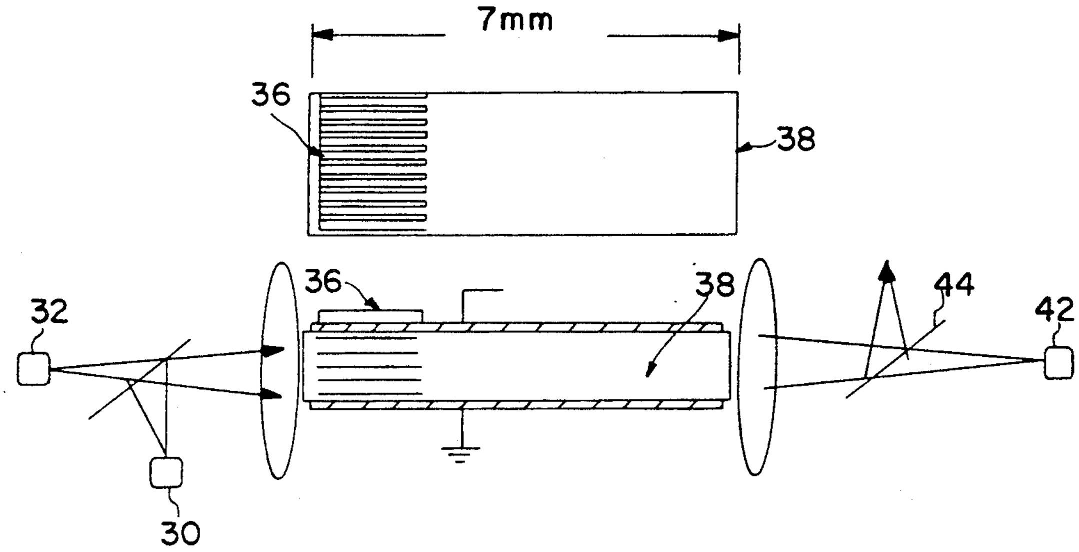
FIG. 5 shows the construction of a monolithic block of the Bragg cell and photorefractive element which can be used in the embodiments of FIGS. 2 and 4.

A schematic diagram of a monolithic processor that can be used with the present invention is shown in FIG. 5. Such a crystal can be extremely small in length, for example 7 millimeters, so that a very compact monolithic antenna array processor can be provided. Also, instead of using gallium arsenide for the block, indium phosphide can be used, which may provide better performance.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An adaptive filter having a correlation weighting structure comprising:

a single Bragg cell, acting as a tapped delay line and having a constantly applied first signal input and an output, said Bragg cell intensity modulating a write laser beam for computing correlation values between the first signal and a second signal, and modulating a read laser field strength for multiplying the correlation values by delaying signal values with the correlation values being a function of position along the Bragg cell;

a photorefractive element which performs time integration, said photorefractive element being arranged such that substantial portions of diffracted and undiffracted light components form the single Bragg cell overlap within said photorefractive element;

element which performs time integration, said photorefractive element being arranged such that substantial portions of diffracted and undiffracted light components form the single Bragg cell overlap within said photorefractive element;

a write laser intensity modulated by a simultaneous constantly applied second signal to produce an optical write signal that is received at the photorefractive element input and which writes correlation coefficients in the photorefractive element;

a read laser producing a light signal, a portion of which is diffracted by the single Bragg cell, the portion of the light signal that is not diffracted by the single Bragg cell being partially diffracted by the photorefractive element;

a photodetector having an input and an output, the photodetector input receiving the portion of the light signal that is diffracted by the single Bragg cell and the portion of the read laser light signal that is diffracted by the photorefractive crystal, the photodetector output producing a filtered signal; an means for isolating the read laser light from the write laser light such that only the read laser light reaches the photodetector;

wherein the write laser and the read laser are a single laser;

wherein the single laser uses time multiplexed laser modulation and readout.

2. An adaptive filter having a correlation weighting structure comprising:

a single Bragg cell, acting as a tapped delay line and having a constantly applied first signal input and an output, said Bragg cell intensity modulating a write laser beam for computing correlation values between the first signal and a second signal, and modulating a read laser field strength for multiplying the correlation values by delaying signal values with the correlation values being a function of position along the Bragg cell;

a photorefractive element which performs time integration, said photorefractive element being arranged such that substantial portions of diffracted and undiffracted light components from the single Bragg cell overlap within said photorefractive element;

a write laser intensity modulated by a simultaneous constantly applied second signal to produce an optical write signal that is received at the photorefractive element input and which writes correlation coefficients in the photorefractive element;

a read laser producing a light signal, a portion of which is diffracted by the single Bragg cell, the portion of the light signal that is not diffracted by the single Bragg cell being partially diffracted by the photorefractive element;

a photodetector having an input and an output, the photodetector input receiving the portion of the light signal that is diffracted by the single Bragg cell and the portion of the read laser light signal that is diffracted by the photorefractive crystal, the photodetector output producing a filtered signal; and means for isolating the read laser light from the write laser light such that only the read laser light reaches the photodetector;

wherein the write laser and the read laser are a single laser;

wherein the single laser uses frequency multiplexed modulation and readout.

3. An adaptive filter having a correlation weighting structure comprising:

a single Bragg cell, acting as a tapped delay line and having a constantly applied first signal input and an output, said Bragg cell intensity modulating a write laser beam for computing correlation values between the first signal and a second signal, and modulating a read laser field strength for multiplying the correlation values by delaying signal values with the correlation values being a function of position along the Bragg cell;

a photorefractive element which performs time integration, said photorefractive element being arranged such that substantial portions of diffracted and undiffracted light components from the single Bragg cell overlap within said photorefractive element;

a write laser intensity modulated by a simultaneous constantly applied second signal to produce an optical wire signal that is received at the photorefractive element input and which writes correlation coefficients in the photorefractive element;

a read laser producing a light signal, a portion of which is diffracted by the single Bragg cell, the portion of the light signal that is not diffracted by the single Bragg cell being partially diffracted by the photorefractive element;

a photodetector having an input and an output, the photodetector input receiving the portion of the light signal that is diffracted by the single Bragg cell and the portion of the read laser light signal that is diffracted by the photorefractive crystal, the photodetector output producing a filtered signal; and means for isolating the read laser light from the write laser light such that only the read laser light reaches the photodetector;

wherein the single Bragg cell is a multiple channel Bragg cell;

wherein the multiple channel Bragg cell and the photorefractive element are a single monolithic block;

wherein the write laser and the read laser are a single laser.

4. The adaptive filter of claim 3, wherein the photodetector is a single photodetector.

* * * * *